US009043795B2

(12) United States Patent
Morrow et al.

(10) Patent No.: US 9,043,795 B2
(45) Date of Patent: May 26, 2015

(54) APPARATUS AND METHODS FOR ADAPTIVE THREAD SCHEDULING ON ASYMMETRIC MULTIPROCESSOR

(75) Inventors: Michael William Morrow, Cary, NC (US); Manish Garg, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 986 days.

(21) Appl. No.: 12/333,063

(22) Filed: Dec. 11, 2008

(65) Prior Publication Data

US 2010/0153954 A1 Jun. 17, 2010

(51) Int. Cl.
*G06F 9/46* (2006.01)
*G06F 9/50* (2006.01)
*G06F 1/32* (2006.01)

(52) U.S. Cl.
CPC ............ *G06F 9/5094* (2013.01); *Y02B 60/144* (2013.01); *Y02B 60/142* (2013.01); *G06F 1/329* (2013.01)

(58) Field of Classification Search
CPC ..... G06F 9/5094; G06F 1/329; Y02B 60/144; Y02B 60/142
See application file for complete search history.

(56) References Cited

U.S. PATENT DOCUMENTS

| 7,176,508 | B2 * | 2/2007 | Joshi et al. ................. 257/253 |
| 7,886,172 | B2 * | 2/2011 | Bose et al. ................. 713/324 |
| 7,916,571 | B2 | 3/2011 | Tessitore |
| 7,991,574 | B2 * | 8/2011 | Gattiker .................. 702/118 |
| 8,076,946 | B1 * | 12/2011 | Rosen ..................... 324/601 |
| 2005/0043909 | A1 | 2/2005 | Poirier et al. |
| 2006/0174683 | A1 * | 8/2006 | Bonne et al. ............. 73/1.02 |
| 2006/0255828 | A1 | 11/2006 | Furukawa |
| 2006/0282692 | A1 | 12/2006 | Oh et al. |
| 2007/0046383 | A1 | 3/2007 | Bhushan |
| 2007/0074011 | A1 | 3/2007 | Borkar et al. |
| 2007/0136617 | A1 | 6/2007 | Kanno |
| 2008/0244278 | A1 | 10/2008 | Monferrer |
| 2009/0328055 | A1 * | 12/2009 | Bose et al. ............... 718/105 |

FOREIGN PATENT DOCUMENTS

| CN | 101278264 A | 10/2008 |
| JP | H05175793 A | 7/1993 |
| JP | 2002288150 A | 10/2002 |
| JP | 2003323417 A | 11/2003 |
| JP | 2004530181 A | 9/2004 |
| JP | 2004280378 A | 10/2004 |

(Continued)

OTHER PUBLICATIONS

Kim et al. ("An On-Die CMOS Leakage Current Sensor for Measuring Process Variation Sub-90nm Generations" IEEE 2004 Symposium on VLSI Circuits Digest of Technical Papers).*

(Continued)

*Primary Examiner* — Meng An
*Assistant Examiner* — Wissam Rashid
(74) *Attorney, Agent, or Firm* — Peter Michael Kamarchik; Nicholas J. Pauley; Joseph Agusta

(57) ABSTRACT

Techniques for adaptive thread scheduling on a plurality of cores for reducing system energy are described. In one embodiment, a thread scheduler receives leakage current information associated with the plurality of cores. The leakage current information is employed to schedule a thread on one of the plurality of cores to reduce system energy usage. On chip calibration of the sensors is also described.

16 Claims, 10 Drawing Sheets

(56) References Cited

FOREIGN PATENT DOCUMENTS

| JP | 2005157620 A | 6/2005 |
|---|---|---|
| JP | 2005267635 A | 9/2005 |
| JP | 2006120175 A | 5/2006 |
| JP | 2006133995 A | 5/2006 |
| JP | 2006319153 A | 11/2006 |
| JP | 2007148952 A | 6/2007 |
| JP | 2008503883 A | 2/2008 |
| JP | 2009510618 A | 3/2009 |
| KR | 20060127120 A | 12/2006 |
| KR | 20060128469 A | 12/2006 |
| WO | 02054198 | 7/2002 |
| WO | 2006002401 A1 | 1/2006 |
| WO | 2007038530 A2 | 4/2007 |
| WO | 2007141870 A1 | 12/2007 |
| WO | 2008000858 A1 | 1/2008 |
| WO | 2008022882 | 2/2008 |
| WO | 2008129625 A1 | 10/2008 |
| WO | 2009142930 | 11/2009 |

OTHER PUBLICATIONS

Clark et al. ("Reverse Body Bias and Supply Collapse for Low Effective Standby Power", IEEE Transactions on Very Large Scale Integration Systems, vol. 12 No. 9, Sep. 2004).*

H. Kim, et al., "An On-Die CMOS Leakage Current Sensor for Measuring Process Variation Sub-90nm Generations," IEEE 2004.

Lawrence T. Clark, et al., "Reverse-Body Bias and Supply Collapse for Low Effective Standby Power," IEEE Transactions on Very Large Scale Integration (VLSI) Systems, vol. 12, No. 9, Sep. 2004, p. 947-956.

International Search Report—PCT/US2009/067654, International Search Authority—European Patent Office Dec. 9, 2010.

Written Opinion—PCT/US2009/067654, International Search Authority—European Patent Office Dec. 9, 2010.

Kim, H., et al., "An On-Die CMOS Leakage Current Sensor for Measuring Process Variation Sub-90nm Generations," 2005 IEEE International Conference on Integrated Circuit and Technology, pp. 221-222.

Abe M., et al., "Production Usina Wafer Mapping System", NEC Technical Report, NEC Corporation, Mar. 30, 2000, vol. 53, No. 4, pp. 128-131.

Toko., M., et al., "A Proposal of Alternating a Hare Processor with a Tortoise Processor for Lower Energy Dissipation", Technical Research Report of The Institute of Electronics, Information and Communication Engineers, The Institute of Electronics, Information and Cornmunication Engineers, Feb. 28, 2003, vol. 102, No. 686, (ICD2002-220 to 231), pp. 37 to 42.

* cited by examiner

APPARATUS AND METHODS FOR ADAPTIVE THREAD SCHEDULING ON ASYMMETRIC MULTIPROCESSOR

FIELD OF THE DISCLOSURE

The present disclosure relates generally to techniques for adapting thread scheduling in an asymmetric multiprocessor system based on leakage current and dynamic power to achieve required performance at a low power expenditure.

BACKGROUND

Many portable products, such as cell phones, laptop computers, personal data assistants (PDAs) and the like, utilize a processing system that executes programs, such as, communication and multimedia programs. A processing system for such products may include multiple processors, memory for storing instructions and data, controllers, peripheral devices, such as communication interfaces, and fixed function logic blocks configured, for example, on a single chip. At the same time, portable products have a limited energy source in the form of batteries that are often required to support high performance operations from the processing system. To increase battery life, when possible, it is desired to perform these operations at reduced power levels. Many personal computers are also being developed to support high performance operations at low power drain to reduce overall energy consumption.

Internal to the processing system, the multiple processors may be configured in a number of different organizations, such as, an asymmetric multiprocessing organization that allows selective load balancing between the multiple processors which may be different and optimized to a particular system function or process, such as video, graphics, or communication processing. The processing functions may be portioned into a number of threads or tasks that are scheduled for execution on selected processors. A thread is considered the smallest individually schedulable process or sequence of instructions which may run in parallel with another thread. In the context of the present invention, a thread and a task may be used interchangeably. Tasks or threads may be sub-functions that are generally assigned to a processor by an operating system (OS) scheduler, for example, to meet performance requirements associated with system functions. Since the power associated with executing a task is a function of frequency, switching capacitance, and the square of the supply voltage, reducing power use generally requires a reduction in at least one of these variables. To more fully optimize power use, many processing systems have control over frequency and operating voltage in one or more circuit domains of power use. Due to the demanding nature of various functions, such as video, graphics, and communication, operating on portable devices, the multiple processors may be required to operate at gigahertz frequencies in order to meet a product's requirements. Since the functional demands on the processing system vary, the operating frequency is generally adapted to the existing system requirements. In a similar manner, reducing voltage, affects not only the power but also the operating frequency of the affected logic and memory devices, which in turn then affects how the frequency is controlled.

As circuit densities increase with each new technology generation, power loss during idle or standby conditions has also increased. Circuit leakage current tends to also increase with increasing circuit densities becoming more and more a source of significant power loss. To achieve increased densities and shorter circuit device delays that allow higher clock frequencies, internal circuit devices' threshold voltage is typically reduced. Reducing the threshold voltage generally increases the leakage current, which also is affected by process variations and temperature. A significant portion of a high density chip's energy use may be attributable to leakage current.

At an operating system scheduler level, task assignment in a multiprocessing system is a difficult problem even within a nominal operating environment having chips manufactured with consistent process characteristics (P) and operating within a constant and nominal operating voltage (V) and a nominal temperature (T), usually referred to as a nominal PVT environment. The problem of assigning tasks becomes even more difficult due to the nature of portable devices since they may use multiple chips manufactured with different processes and may also experience wide variations in the process characteristics within chips and between chips, use of different operating voltages which may be controllable, and be subjected to wide variations in ambient temperature. The variations in PVT generally have a dramatic affect on a chip's power utilization, including dynamic and static leakage power.

SUMMARY

An embodiment of the invention addresses a method for adaptive thread scheduling on a plurality of cores for reducing system energy. A thread scheduler receives leakage current information associated with the plurality of cores. The leakage current information is employed to schedule a thread on one of the plurality of cores to reduce system energy usage.

Another embodiment of the invention addresses an apparatus for adaptive thread scheduling on a plurality of cores for reducing system energy. A plurality of sensors associated with the plurality of cores provides leakage current information. A plurality of cores runs an adaptive thread scheduler, each core having an assigned frequency of operation and source voltage level depending upon the task to be assigned to the core. The adaptive thread scheduler employing the leakage current information to schedule a thread on one of the plurality of cores to reduce system energy usage.

Another embodiment of the invention addresses a computer readable storage medium whose contents cause an asymmetric multiprocessor to perform a method for adaptive thread scheduling on a plurality of processor cores for reducing system energy. A thread scheduler receives leakage current information associated with the plurality of cores. The leakage current information is employed to schedule a thread on one of the plurality of cores to reduce system energy usage.

Other embodiments of the present invention will become readily apparent to those skilled in the art from the following detailed description, wherein various embodiments of the invention are shown and described by way of illustration. As will be realized, the invention may be embodied in other and different embodiments and its several details are capable of modification in various other respects, all without departing from the present invention. Accordingly, the drawings and detailed description are to be regarded as illustrative in nature and not as restrictive.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Computer program code or "program code" for being operated upon or for carrying out operations according to the teachings of the invention may be written in a high level programming language such as C, C++, JAVA®, Smalltalk, JavaScript®, Visual Basic®, TSQL, Perl, or in various other programming languages. Programs for a target processor architecture may also be written directly in the native assembler language. A native assembler program uses instruction mnemonic representations of machine level binary instructions. Program code or programs stored on a computer readable storage medium as used herein refers to machine language code such as object code whose format is understandable by a processor.

Figure 1:
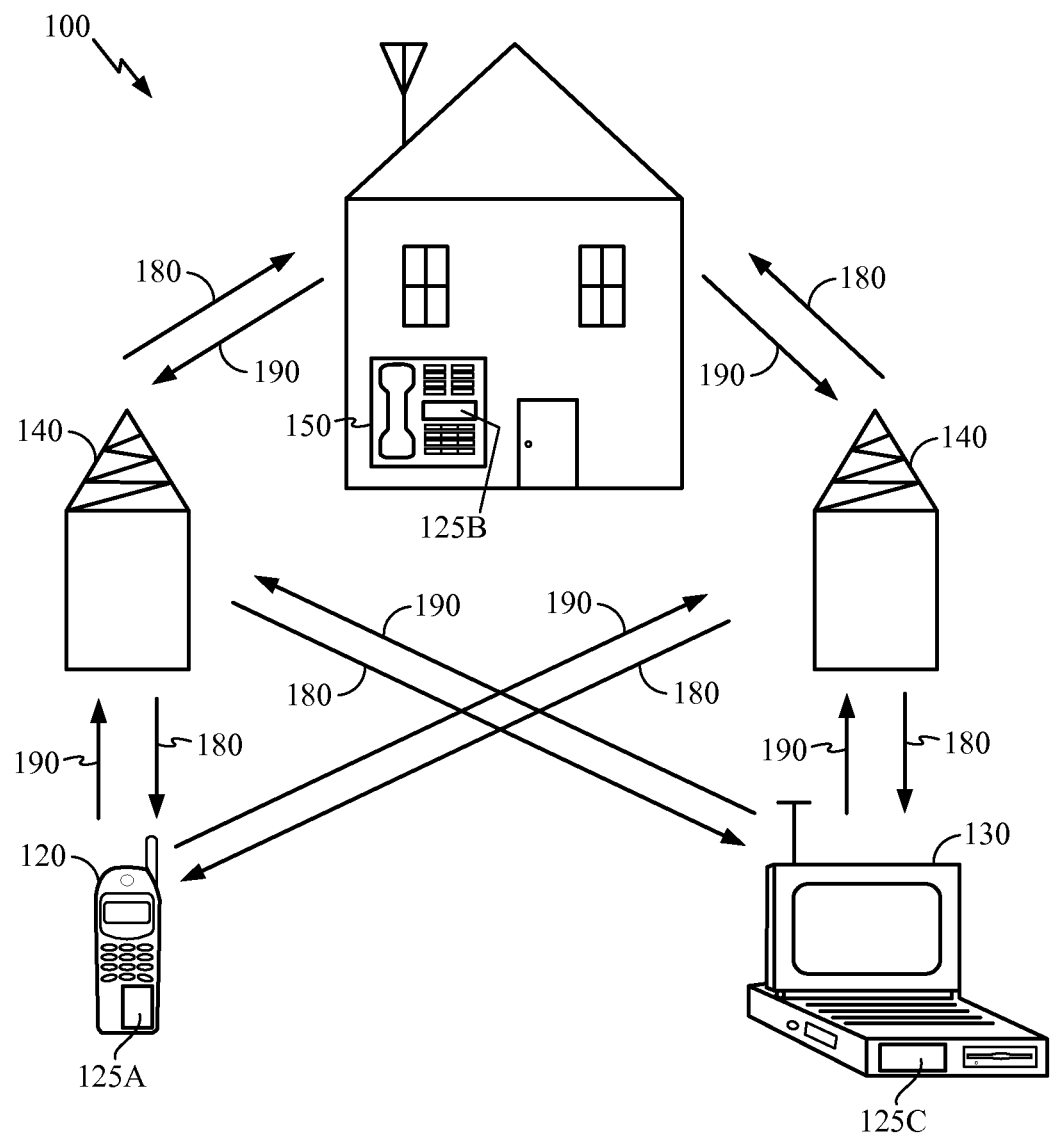
FIG. 1 illustrates an exemplary wireless communication system.

FIG. 1 illustrates an exemplary wireless communication system 100 in which an embodiment of the invention may be advantageously employed. For purposes of illustration, FIG. 1 shows three remote units 120, 130, and 150 and two base stations 140. FIG. 1 also shows forward link signals 180 from the base stations 140 and the remote units 120, 130, and 150 and reverse link signals 190 from the remote units 120, 130, and 150 to base stations 140. It will be recognized that common wireless communication systems may have many more remote units and base stations. Remote units 120, 130, and 150 include hardware components, software components, or both as represented by components 125A, 125B, and 125C, which have been adapted to embody the invention. For example, the components 125A, 125B, and 125C may include sensors, processors, and adaptive thread scheduling software as discussed further below.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, pagers, walkie talkies, hand-held personal communication systems (PCS) units, portable data units such as personal data assistants, or fixed location data units such as meter reading equipment. Although FIG. 1 illustrates remote units according to the teachings of the disclosure, the disclosure is not limited to these exemplary illustrated units. Embodiments of the invention may be suitably employed in any device having two or more processors and sensors from which static leakage current and dynamic power may be determined as described in further detail below.

Figure 2A:
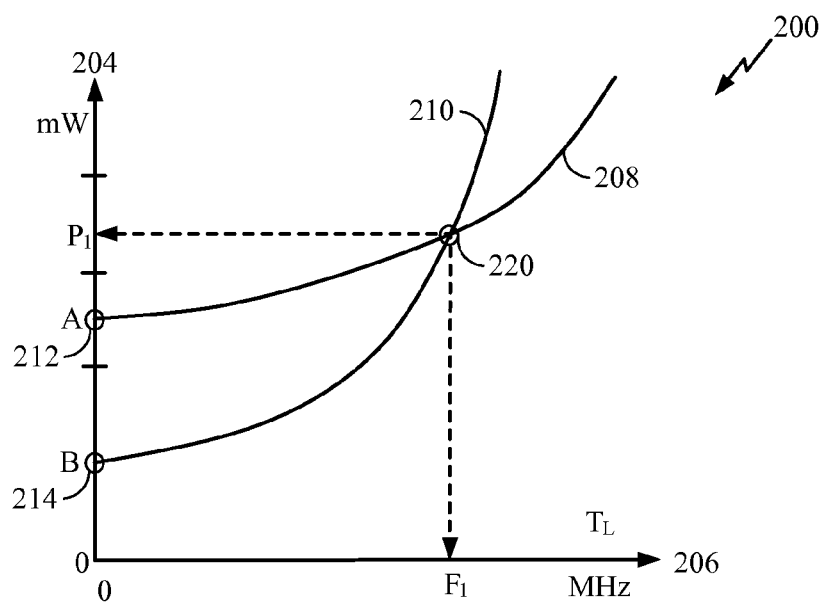
FIG. 2A illustrates a graph of power versus operating frequency that is illustrative of a particular process (P), voltage (V), temperature (T) PVT environment with low temperature for an exemplary dual processor core.

FIG. 2A illustrates a graph 200 of power 204 in milliwatts (mW) versus operating frequency 206 in megahertz (MHz) that is illustrative of a process (P), voltage (V), temperature (T) $PVT_L$ environment with low temperature ($T_L$) for an exemplary dual processor core. A dynamic power versus frequency (PvF) curve 208 for a core-A and a PvF curve 210 for a core-B begin at power points 212 and 214, respectively. Power points 212 and 214 are the static leakage power for core-A and core-B, respectively, at the $PVT_L$ environment. In particular, core-A has a higher leakage power than core-B as indicated by power point 212 but uses less dynamic power per operation at high frequencies above frequency $F_1$ than core-B. Core-B has a lower leakage power as indicated by power point 214 and is more efficient at lower frequencies below $F_1$ as compared to core-A. The crossover point ($P_1$, $F_1$) 220 represents a crossover decision point to be considered for allocating tasks to core-A or to core-B depending upon operating frequency and PVT environment for the dual cores.

Figure 2B:
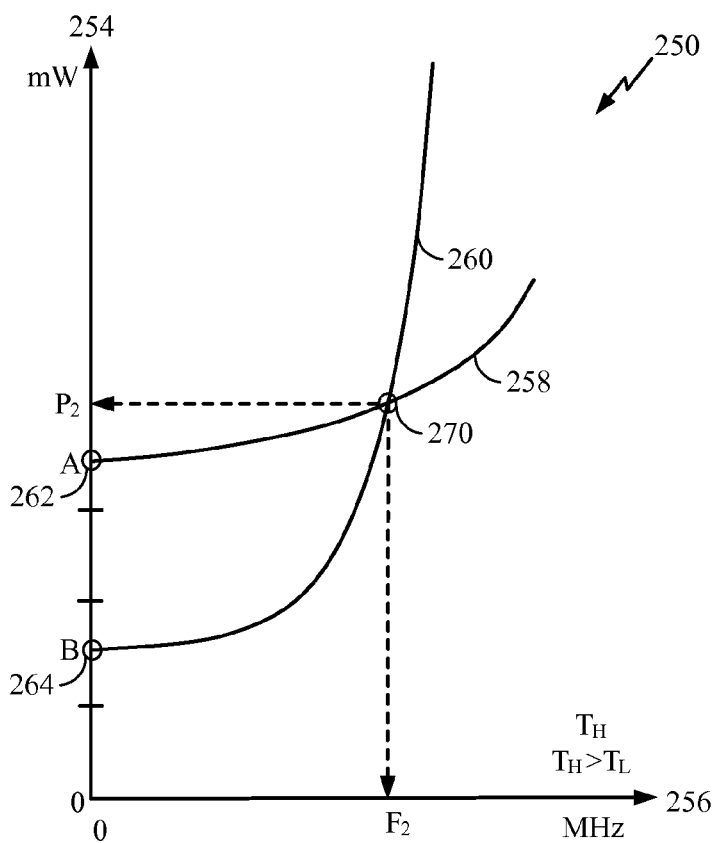
FIG. 2B illustrates a graph of power versus operating frequency that is illustrative of a PVT environment with high temperature for the dual processor core of FIG. 2A.

291 FIG. 2B illustrates a graph 250 of power 254 versus operating frequency 256 that is illustrative of a $PVT_H$ environment with high temperature ($T_H$) for the dual processor core of FIG. 2A. A dynamic PvF curve 258 for the core-A and a PvF curve 260 for the core-B begin at power points 262 and 264, respectively. Power points 262 and 264 are the static leakage power for core-A and core-B, respectively, at the $PVT_H$ environment, where $T_H > T_L$. In particular, core-A has a higher leakage power than core-B as indicated by power point 262 but uses less dynamic power per operation at high frequencies above frequency $F_2$ than core-B. Core-B has a lower leakage power as indicated by power point 264 and is more efficient at lower frequencies below $F_2$ as compared to core-A. The crossover point ($P_2$, $F_2$) 270 represents another decision point to be considered for allocating tasks to core-A or to core-B depending upon operating frequency and PVT environment for the dual cores.

A comparison of the graphs 200 and 250 indicates that the higher temperature associated with graph 250, causes the crossover point ($P_2$, $F_2$) 270 to be at a higher power level, $P_2 > P_1$, and lower frequency, $F_2 < F_1$, than the crossover point ($P_1$, $F_1$) 220. For the exemplary dual processor core characterized by the two graphs 200 and 250, lower power use would generally be obtained by allocating tasks having a selected operating frequency below the crossover frequency $F_1$ or $F_2$ to core-B and for selected task operating frequencies above the crossover point frequency to allocate tasks to core-A.

The dual cores evaluated in FIGS. 2A and 2B may be designed for two different manufacturing processes. For example, core-A may be manufactured primarily with a low voltage threshold (lo-Vt) transistor process to achieve high performance, but at a cost of increased leakage current. Core-B may be manufactured primarily with a high threshold (hi-Vt) transistor process to achieve good performance with low leakage current. Also, either of the two cores may be manufactured with a mix of hi-Vt and lo-Vt transistors, using the lo-Vt transistors in timing critical path circuits, for example. The techniques of the present invention are applicable to cores manufactured with one or more processes including any of the manufacturing designs addressed above as well as others to which the principles of the invention are applicable now or in the future.

Figure 3:
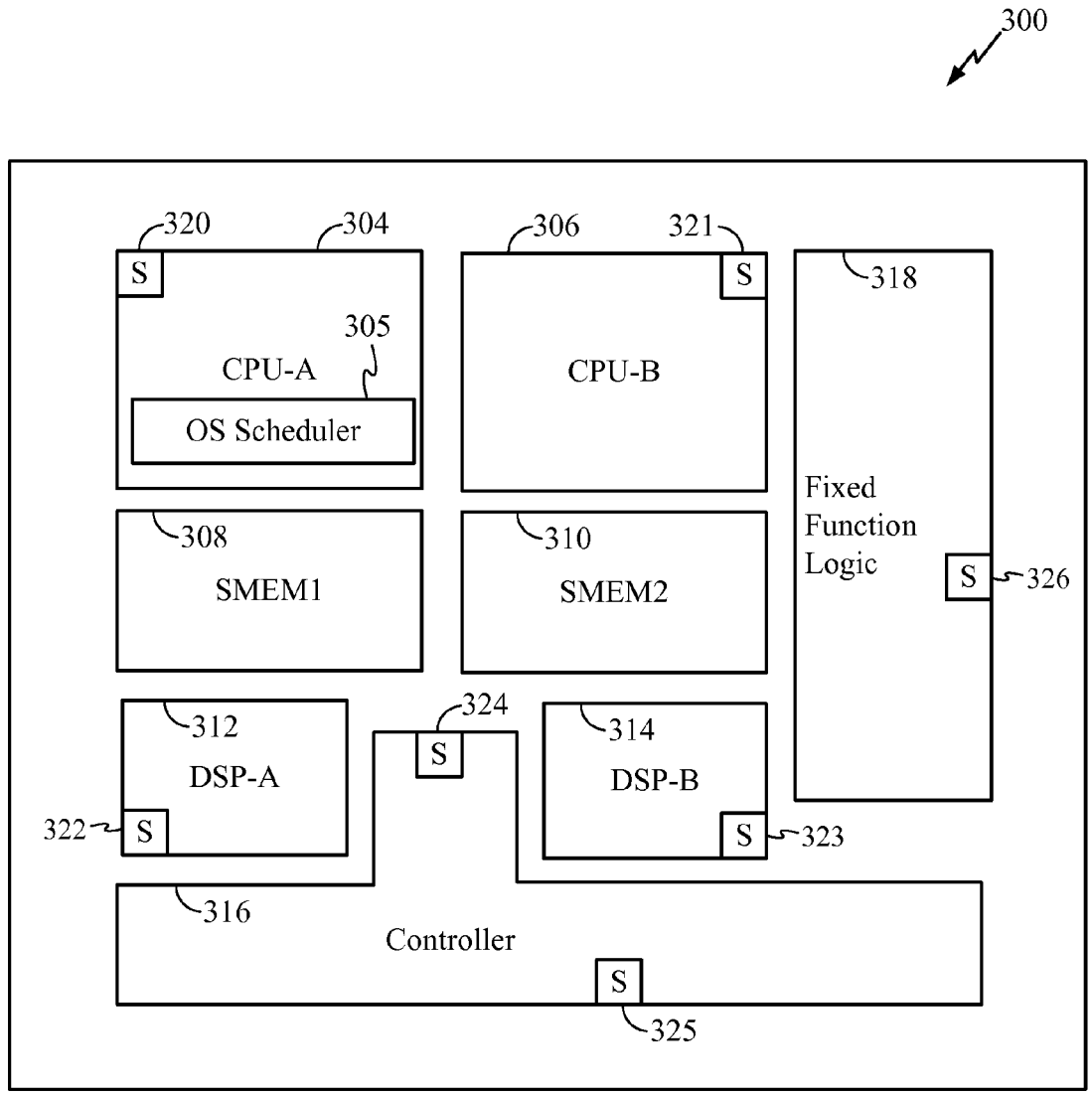
FIG. 3 is a block diagram illustrating an exemplary asymmetric multiprocessor system on a chip.

FIG. 3 illustrates an exemplary asymmetric multiprocessor system on a chip (SoC) 300. It is noted that the particular configuration shown in FIG. 3 is exemplary and the techniques of the present invention are applicable to other system configurations consisting of multiple chips and chips having more or less frequency and voltage controllable power domains than shown in FIG. 3. The exemplary asymmetric multiprocessor SoC 300 includes a central processing unit A (CPU-A) 304, a CPU-B 306, a shared memory 1 (SMEM-1) 308, a SMEM-2 310, a digital signal processor A (DSP-A) 312, a DSP-B 314, a controller 316, fixed function logic 318 and sensors 320-326. The sensors 320-326 are placed to monitor conditions which could affect task assignments on the various cores, such as CPU-A 304, CPU-B 306, DSP-A 312, and DSP-B 314, and affect operation on the controller 316 and fixed function logic 318, for example, in response to crossover point information for the asymmetric multiprocessor SoC 300. An operating system (OS) scheduler, such as OS scheduler 305, may operate on one or more of the processors in a multiprocessor system. The scheduler would schedule tasks to run on the processors based on the relative power and performance curves of the multiprocessor system across the PVT operating space, as described in more detail below.

Figure 4A:
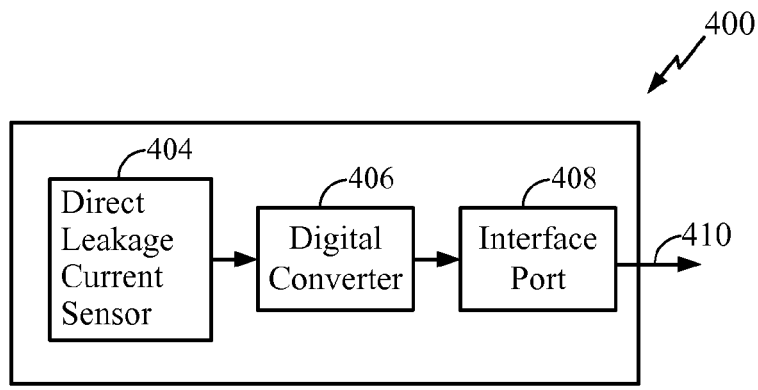
FIG. 4A is a block diagram illustrating an exemplary first sensor circuit.

FIG. 4A is a block diagram illustrating an exemplary first sensor circuit 400. The first sensor circuit 400 includes a direct leakage current sensor 404, a digital converter 406, and an interface port 408 which outputs a leakage current value on output 410. Various types of leakage current sensors may be used for the direct leakage current sensor 404. Such a leakage sensing circuit is described in "An On-Die CMOS Leakage Current Sensor for Measuring Process Variation in Sub-90 nm generations" by D. H. Kim, K. Roy, S. Hsu, R. K. Krishnamurthy, and S. Borkar, IEEE 2004 Symposium on VLSI Circuits digest of technical papers, pages 250 and 251 which is incorporated herein by reference. Based on the type of leakage current sensor used, an appropriate digital converter is selected for the digital converter 406. The leakage current value on output 410 is also utilized in a calibration process as described in further detail below. The leakage current value may be monitored during chip operation, such as when a particular voltage and frequency controllable power domain is in an idle or low power state with the frequency at zero Hertz (Hz) for that controllable power domain.

Figure 4B:
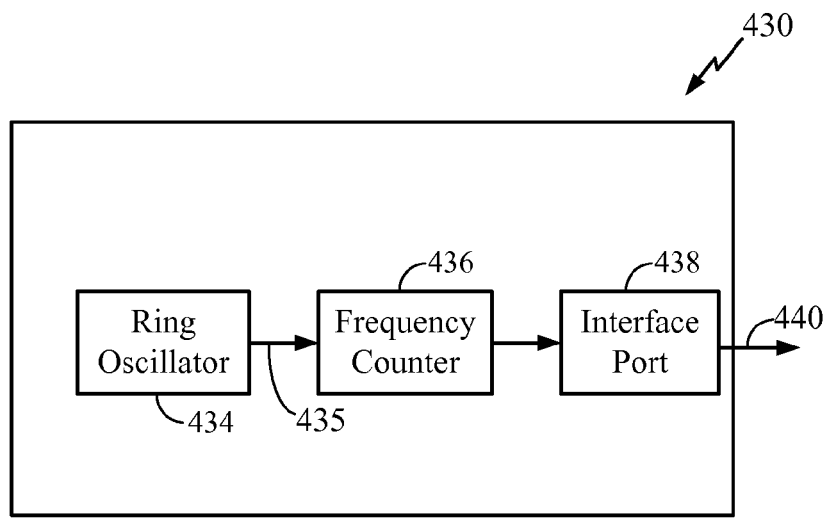
FIG. 4B is a block diagram illustrating an exemplary second sensor circuit.

FIG. 4B is a block diagram illustrating an exemplary second sensor circuit 430. The second sensor circuit 430 includes a ring oscillator 434, a frequency counter 436, an interface port 438, and an output 440. The ring oscillator 434 may be constructed with transistors used in the controllable power domain it is associated with to determine the leakage current for the associated controllable power domain. For example, a ring oscillator may be constructed with high threshold voltage transistors that may be predominantly used in CPU-A 304 and operate with a frequency from which the leakage current associated with CPU-A 304 may be determined. The ring oscillator output 435 consists of an oscillating waveform that is counted in frequency counter 436 during a fixed measurement period to determine a frequency count that is representative of the leakage current. The frequency count is selected by the interface port 438 for output.

In another embodiment, multiple ring oscillators may be utilized based on the type of transistors used in a core. For example, in a core constructed with a combination of low threshold voltage transistors and high threshold voltage transistors, two ring oscillators may be utilized. One ring oscillator is constructed with low threshold voltage transistors and another ring oscillator is constructed with high threshold voltage transistors. Both ring oscillators would be measured and read providing leakage current information for the associated core. In another embodiment, the design of the second sensor circuit 430 may generally be duplicated, but constructed with a different set of transistors than was utilized for determining leakage current information, and used to gauge process variations.

Figure 4C:
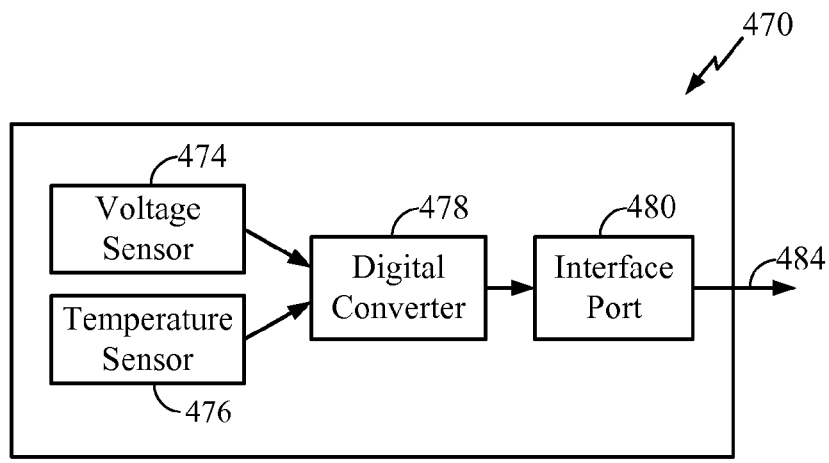
FIG. 4C is a block diagram illustrating an exemplary third sensor circuit.

FIG. 4C is a block diagram illustrating an exemplary third sensor circuit 470. The third sensor circuit 470 includes a voltage sensor 474, a temperature sensor 476, a digital converter 478, an interface port 480, and an output 484. The voltage sensor 474 and the temperature sensor 476 may each produce a voltage level associated with the voltage and temperature, respectively, for the controllable power domain, such as, CPU-A 304, for example. The output voltage levels of both sensors are converted to a digital format in digital converter 478, such as use of an analog to digital converter, and may be tagged according to the type of sensor measured and its location. The converted voltage and temperature values are then selected for output by the interface port 440.

Figure 5:
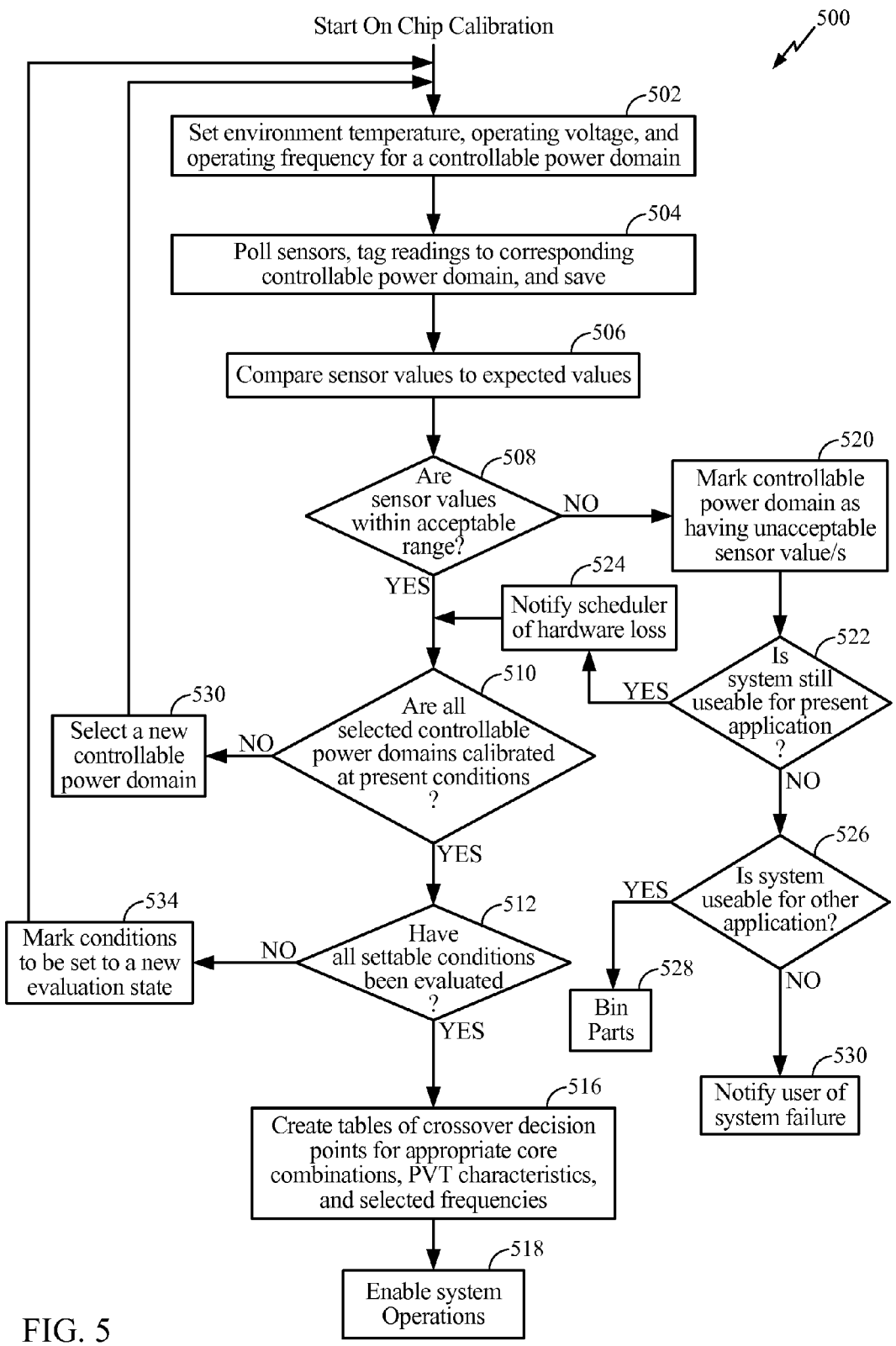
FIG. 5 is a flowchart for an exemplary on chip sensor calibration process.

FIG. 5 is a flowchart for an on chip sensor calibration process 500. The process 500 may be embodied in a software procedure or procedures operating within the framework of the multi-processor OS which may also control an output to adjust the environment temperature in a testing configuration. The process 500 includes setting an operating environment external to a chip being calibrated, reading on chip sensor values, evaluating the read sensor values, determining crossover decision points, and determining whether the chip or system is operational for the intended application. Also, the process 500 may be run during product system testing where the environment temperature may not be controlled. In this case, the calibration process samples the existing temperature at test time from multiple temperature sensors with all of the core's selectable operating frequencies set to zero hertz, compares the multiple temperature sensor readings to find an average temperature among the readings that are within an acceptable tolerance, and adjusts the calibration process accordingly. Also, the sensors may be recalibrated based on new readings obtained during product operating conditions which occur in later system use.

At block 502, an initial environment temperature, operating voltage, and operating frequency are set for a controllable power domain, such as CPU-A 304 of FIG. 3. For example, a low temperature, low operating voltage, and zero frequency may be set to determine a leakage current static power value, such as may be associated with power point 212 of FIG. 2A. At block 504, the sensor or sensors are polled, the readings are tagged according to the type of sensors measured and to the controllable power domain under test, and are saved for later evaluation, as described in more detail below. For example, sensor 320 of FIG. 3 is read, tagged, and the reading saved. At block 506, the sensor values are compared to expected values, for example, minimum and maximum expected values. At decision block 508, it is determined whether the sensor values are within the acceptable range. If the sensor values are within the acceptable range, the process 500 proceeds to decision block 510. At decision block 510, it is determined whether all selected controllable power domains are calibrated. If all the selected controllable power domains have been calibrated, then the process 500 proceeds to decision block 512. At decision block 512, it is determined whether all settable conditions have been evaluated. If all settable conditions have been evaluated, the sensor calibration process proceeds to block 516. At block 516, a table or tables of crossover decision points is created for appropriate core combinations, PVT characteristics, and selected frequencies. At block 518, the sensor calibration process ends and system operations may be enabled. After being enabled, the OS scheduler 305 of FIG. 3 may schedule threads on the various cores employing the various calibrated sensor readings as described in more detail below.

Returning to decision block 508, if the sensor values are not within an acceptable range, then the process 500 proceeds to block 520. At block 520, the controllable power domain is marked as having unacceptable sensor value or values. At decision block 522, it is determined whether the system is still usable for the present application. If the system is still usable for the present application, the process 500 proceeds to block 524. At block 524, the OS scheduler 305 is notified of the hardware loss. For example, in a fault tolerant system, having one CPU off line and powered off may be acceptable for system operations. If the system is not useable for the present application, the process 500 proceeds to block 526. At decision block 526, it is determined whether the system is usable for other applications, such as, for example, a desktop system not requiring battery operation. If the system is usable for other applications, the process 500 proceeds to block 528. At block 528, the part is marked for binning according to the sensor values. For example, parts may be binned according ranges of leakage current information provided by the sensors. If the system is not usable for other applications, the process 500 proceeds to block 530. At block 530, the user is notified of system failure.

Returning to decision block 510, if it is determined that all selected controllable power domains have not been calibrated, then the process 500 proceeds to block 530. At block 530, a new controllable power domain, such as CPU-B 306, is selected for sensor calibration of sensor 321 of FIG. 3. The process 500 returns to block 502 to adjust the environment temperature, operating voltage, and operating frequency for the new controllable power domain, if required, to a setting comparable to that utilized in the calibration of the sensors for the initial controllable power domain.

Returning to decision block 512, if it is determined that all settable conditions have not been evaluated, the process 500 proceeds to block 534. At block 534, the conditions that are to be set to a new evaluation state are marked and the process 500 returns to block 502 to set the new conditions.

Figure 6A:
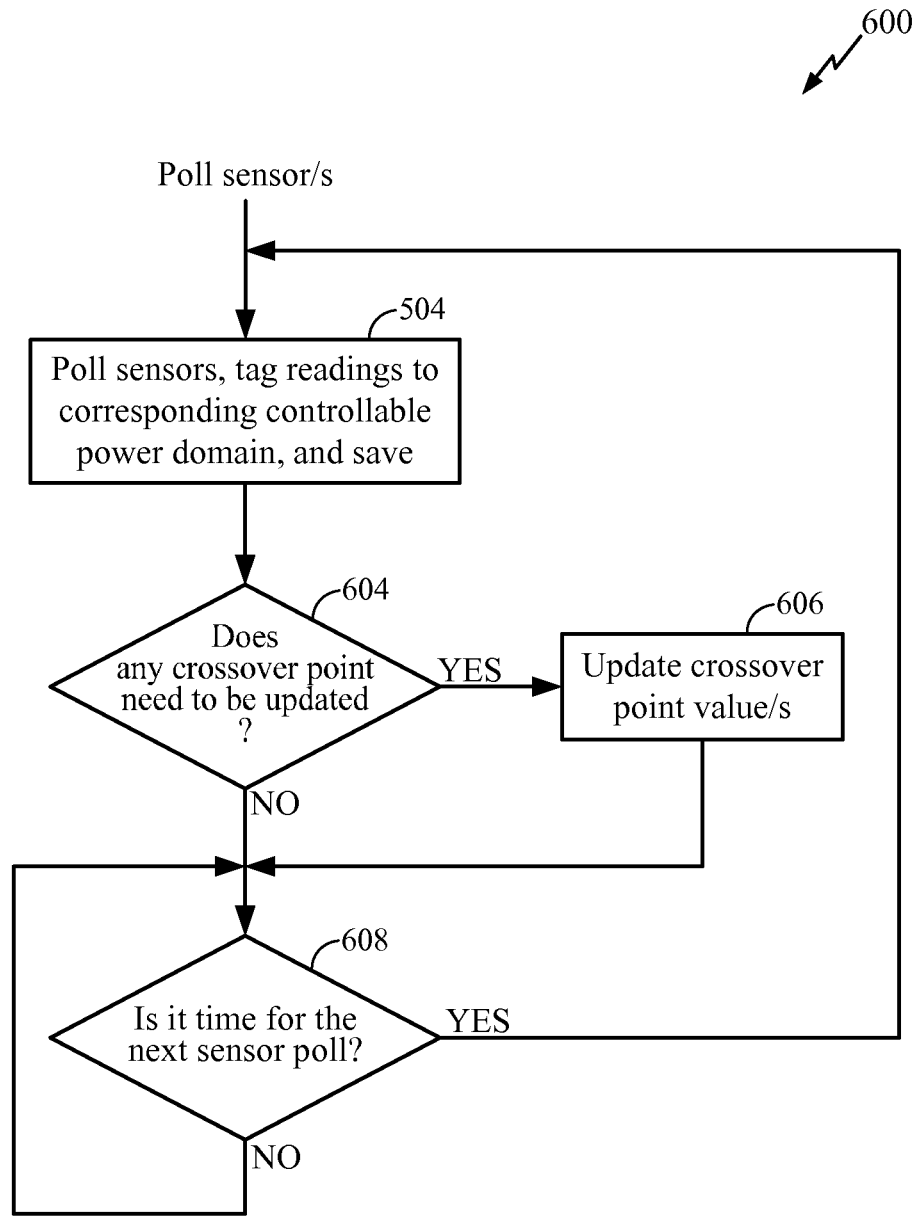
FIG. 6A a flowchart for an exemplary sensor polling background process.

FIG. 6A is a flowchart for an exemplary sensor polling background process 600. The process 600 may be embodied in a software procedure or procedures operating within the framework of the multi-processor OS. During system operation, the sensors are polled, for example, at specific time periods or prior to assigning tasks to various controllable power domains. At block 504, the sensors are polled, the readings are tagged to corresponding controllable power domains, and are saved for later evaluation. At decision block 604, it is determined whether any crossover point needs to be updated. For example, the environment temperature may change rapidly for a portable device affecting crossover points as illustrated with the graphs 200 of FIG. 2A and 250 of FIG. 2B. If a crossover point needs to be updated, the background process 600 proceeds to block 606. At block 606, the appropriate crossover point or points are updated. Returning to decision block 604, if no crossover points need to be updated, then the background process 600 proceeds to decision block 608. At decision block 608, it is determined whether it is time for the next sensor poll. If it is time for the next sensor poll, the background process 600 proceeds to block 504. If it is not time for the next sensor poll, the background process 600 waits till the sensor polling time is reached. While the background process 600 is in operation, other system operations continue to meet the product operation requirements.

Figure 6B:
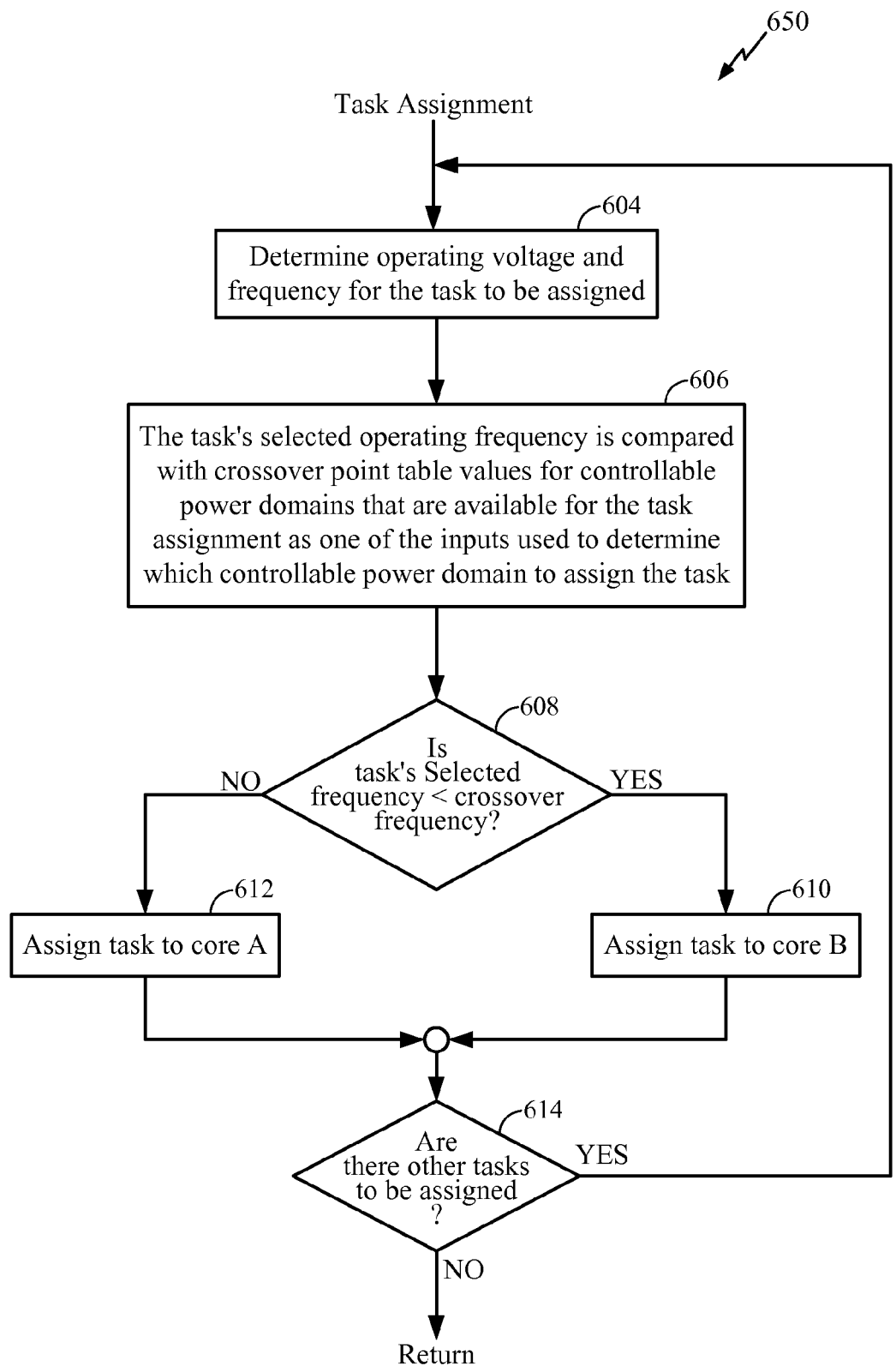
FIG. 6B is a flowchart for an exemplary first adaptive thread scheduling process based in part on leakage current information.

FIG. 6B is a flowchart for an exemplary first adaptive thread scheduling process 650 based in part on leakage current information. The process 650 may be embodied in a software procedure or procedures operating within the framework of the multi-processor OS, such as OS scheduler 305 of FIG. 3. The process 650 is illustrated for the exemplary case when a task may be assigned to one of two processor cores, such as CPU-A 304 and CPU-B 306 of FIG. 3. A multi-processor OS scheduler or the like determines a task is to be assigned. At block 604, the task to be assigned is evaluated to determine the appropriate operating voltage and frequency for running the task. At block 606, the task's selected operating frequency is compared with crossover decision point values for controllable power domains that are available for the task assignment as one of the inputs used to determine which controllable power domain to assign the task. At block 608, it is determined whether the task's selected frequency is less than the appropriate crossover frequency. If the task's frequency is less, the process 650 proceeds to block 610. At block 610, the task is assigned to a first core controllable power domain, such as CPU-B 306. If the task's frequency is greater than or equal to the appropriate crossover frequency, the process 650 proceeds to block 612. At block 612, the task is assigned to a second core controllable power domain, such as CPU-A 304. At decision block 614, it is determined whether there are any other tasks to be assigned. If there are further tasks to be assigned, the process 650 returns to block 604. If there are no further tasks to be assigned, the process 650 returns to the calling routine. The adaptive thread scheduling process is scalable to more than two cores. In the case of three or more controllable power domains, multiple crossover points may be evaluated in determining the assignment of tasks.

Figure 7A:
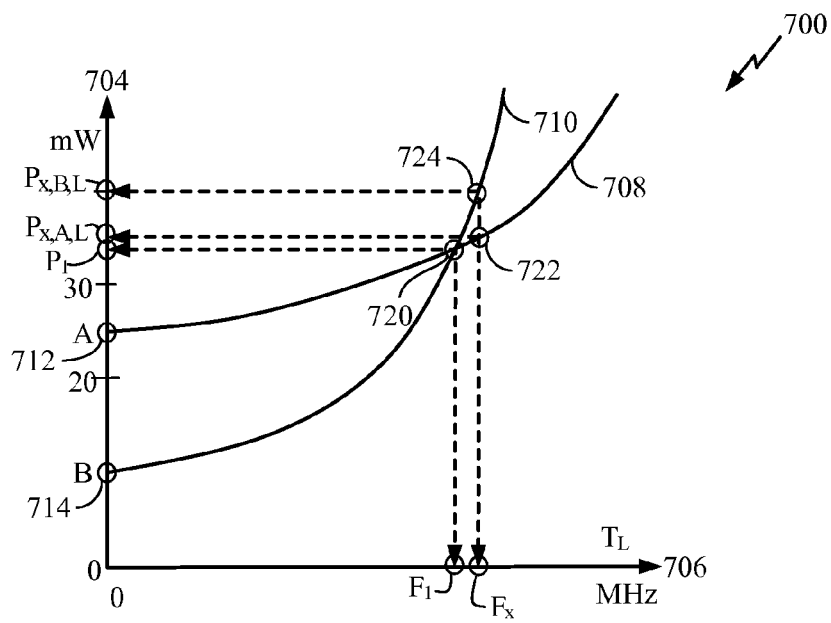
FIG. 7A illustrates a graph of power versus operating frequency that is illustrative of a process (P), voltage (V), temperature (T) PVT environment with low temperature for an exemplary dual processor core.

FIG. 7A illustrates a graph 700 of power 704 in milliwatts (mW) versus operating frequency 706 in megahertz (MHz) that is illustrative of a process (P), voltage (V), temperature (T) $PVT_L$ environment with low temperature ($T_L$) for an exemplary dual processor core. A dynamic power versus frequency (PvF) curve 708 for a core-A and a PvF curve 710 for a core-B begin at power points 712 and 714, respectively. Power points 712 and 714 are the static leakage power for core-A and core-B, respectively, at a particular $PVT_L$ condition. In particular, core-A has a higher leakage power than core-B of approximately 25 mWs as indicated by power point 712 but uses less dynamic power per operation at high frequencies above frequency $F_1$ than core-B. Core-B has a lower leakage power of approximately 10 mWs as indicated by power point 714 and is more efficient at lower frequencies below $F_1$ as compared to core-A. The crossover point ($P_1, F_1$)

720 represents a crossover point which may be considered for allocating tasks to core-A or to core-B depending upon operating frequency and PVT environment for the dual cores.

Figure 7B:
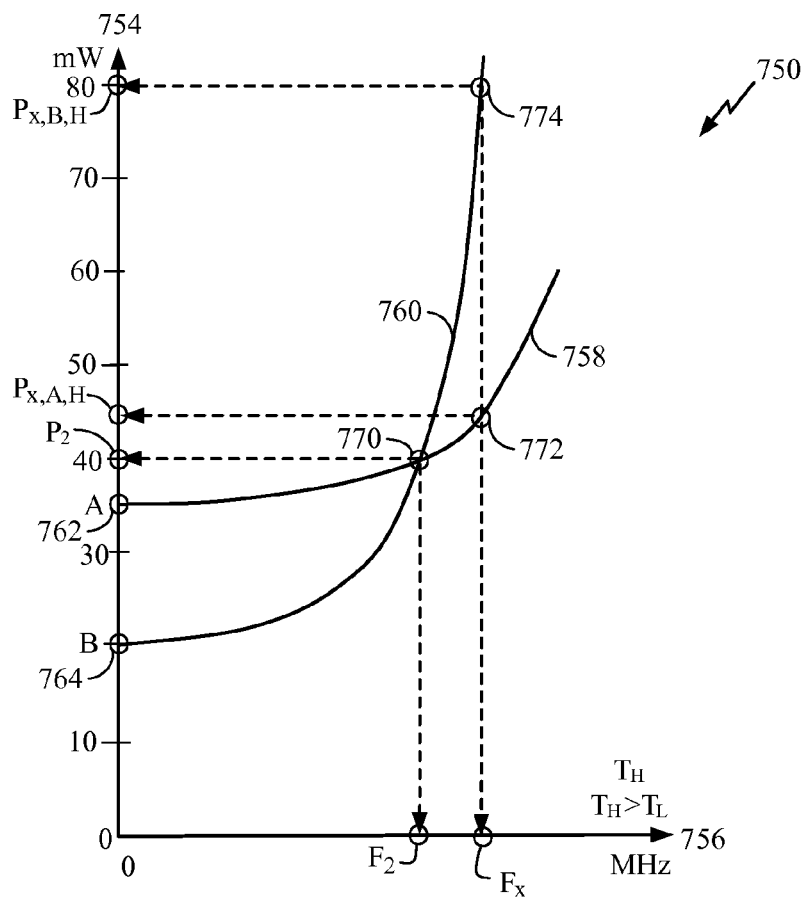
FIG. 7B illustrates a graph of power versus operating frequency that is illustrative of a PVT environment with high temperature for the exemplary dual processor core of FIG. 7A.

FIG. 7B illustrates a graph 750 of power 754 versus operating frequency 756 that is illustrative of a $PVT_H$ environment with high temperature ($T_H$) for the exemplary dual processor core of FIG. 7A. A dynamic PvF curve 758 for a core-A and a PvF curve 760 for a core-B begin at power points 762 and 764, respectively. Power points 762 and 764 are the static leakage power for core-A and core-B, respectively, at a $PVT_H$ condition, where $T_H>T_L$. In particular, core-A has a higher leakage power of approximately 35 mWs than core-B as indicated by power point 762 but uses less dynamic power per operation at high frequencies above frequency $F_2$ than core-B. Core-B has a lower leakage power of approximately 20 mWs as indicated by power point 764 and is more efficient at lower frequencies below $F_2$ as compared to core-A. The crossover point ($P_2, F_2$) 770 represents another decision point which may be considered for allocating tasks to core-A or to core-B depending upon operating frequency and PVT environment for the dual cores.

As an example, a particular task is to be allocated to one of two processor cores having characteristics as illustrated in FIGS. 7A. The particular task requires a frequency x ($F_x$) on either core to meet requirements. The frequency $F_x$ also requires a minimum core voltage source for both cores. At an operating temperature $T_L$ and the frequency $F_x$ as illustrated in FIG. 7A, core-A will exhibit a dynamic power $P_{x,A,L}$ associated with point ($P_{x,A,L}, F_x$) 722 and core-B exhibits a dynamic power $P_{x,B,L}$ associated with point ($P_{x,B,L}, F_x$) 724. For this particular task, the core-A power comprises the leakage power ($P_{L,A,L}$) plus the dynamic power ($P_{D,A,L}$) which equals, for this example, 25 mW+35 mW=60 mW. The core-B power equals $P_{L,B,L}+P_{D,B,L}$=10 mW+40 mW=50 mW. Based on this analysis, this particular task should be allocated to core-B, even though it is above the crossover point 720 and has a dynamic power component (40 mW) that is higher than core-A's dynamic power (35 mW). The leakage power for core-A at point 712 makes a significant power contribution in the determination of where this particular task is to be assigned.

The analysis is reconsidered at a higher temperature $T_H$ ($T_H>T_L$) as illustrated in FIG. 7B. At the operating temperature $T_H$ and the frequency $F_x$, core-A will exhibit a dynamic power $P_{x,A,H}$ associated with point ($P_{x,A,H}, F_x$) 772 and core-B exhibits a dynamic power $P_{x,B,H}$ associated with point ($P_{x,B,H}, F_x$) 774. For this particular task, the core-A power comprises the leakage power ($P_{L,A,H}$) plus the dynamic power ($P_{D,A,H}$) which at $T_H$ equals 35 mW+45 mW=80 mW. The core-B power equals $P_{L,B,H}+P_{D,B,H}$=20 mW+80 mW=100 mW. Based on this analysis, this particular task should be allocated to core-A. At the higher temperature, the dynamic power component of core-B makes a significant contribution in the determination of where this particular task is to be assigned.

Based on the analysis as illustrated in FIGS. 7A and 7B, a scheduling algorithm may be used based on a linear-system optimization. For example, power for a core-i at temperature "t" is $P_{i,t}$ which is equal to the leakage power ($P_{L,i,t}$) plus the dynamic power ($P_{D,i,t}$). The power for all cores is $P_{cores,t}=\Sigma P_{i,t}$.

The dynamic power depends upon the core supply voltage (V), the operating frequency (F), and the switching capacitance (C) governed generally by equation (1):

$$P_D=CV^2F \quad (1)$$

where V is operating voltage, F is operating frequency, and C is a constant representing the switching capacitance of the controllable power domain being evaluated. Each task to be allocated to a core is required to operate at a minimum frequency F for that core which is determined by software in order to meet requirements. The supply voltage is also determined by software to reduce power while providing sufficient power to operate the core at the specified frequency F. The switching capacitance is determined by design and the manufacturing process prior to product release. Thus, the dynamic power may be a calculated value that is approximated by the operating system scheduler without the need for sensors.

Since the leakage power is strongly dependent on temperature and the process, sensors are used to provide leakage information to the scheduler. By approximating the leakage power based on sensor input and calculating the dynamic power for each core to be allocated a task at a particular frequency F and voltage V, the scheduler may choose the core with the lowest power rating. By utilizing the adaptive scheduling approach, the effects of leakage current which varies as the chip ages may also be taken into account. Also, as a fault tolerant mechanism, the adaptive scheduling approach may take into account any on chip failure which causes the leakage current to increase beyond an acceptable range.

Figure 8:
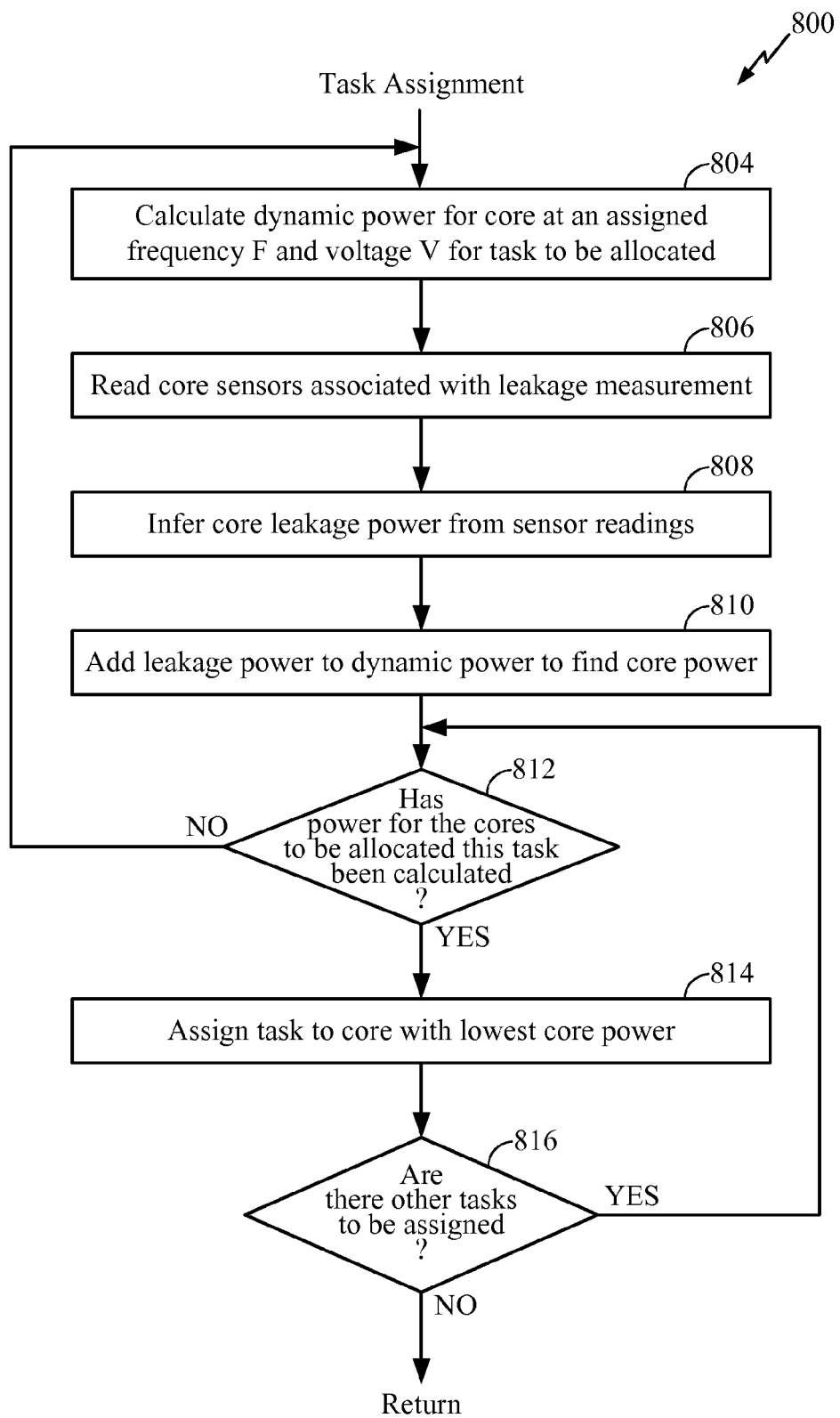
FIG. 8 is a flowchart for an exemplary second adaptive thread scheduling process based in part on leakage current information.

FIG. 8 is a flowchart for an exemplary second adaptive thread scheduling process 800 based in part on leakage current information. The process 800 may be embodied in a software procedure or procedures operating within the framework of the multi-processor OS, such as OS scheduler 305 of FIG. 3. A task to be assigned to one of a plurality of cores, has been evaluated for operating frequency F and voltage V for the cores under consideration. At block 804, the dynamic power is calculated for a core at an assigned frequency F, voltage V, and a specified switching value C. At block 806, the core sensors associated with a leakage measurement are read. At block 808, the core leakage power is inferred from the sensor readings. At block 810, the inferred leakage power is added to the dynamic power to find the core power. At decision block 812, it is determined whether the core power for the cores to be allocated this task has been calculated. If the power for the cores to be allocated this task has not been calculated then the process 800 returns to block 804 to evaluate another core. The process 800 continues until all the cores to be considered for this task assignment have been evaluated. Once the individual core power for cores to be considered for this task assignment have been evaluated, the process 800 proceeds to block 814. At block 814, the task is assigned to the core with the lowest core power. At decision block 816, it is determined whether there are more tasks to be assigned. If there are more tasks to be assigned, the process 800 returns to decision block 812. If there are no more tasks to be assigned, the process 800 returns to the calling routine.

Figure 9:
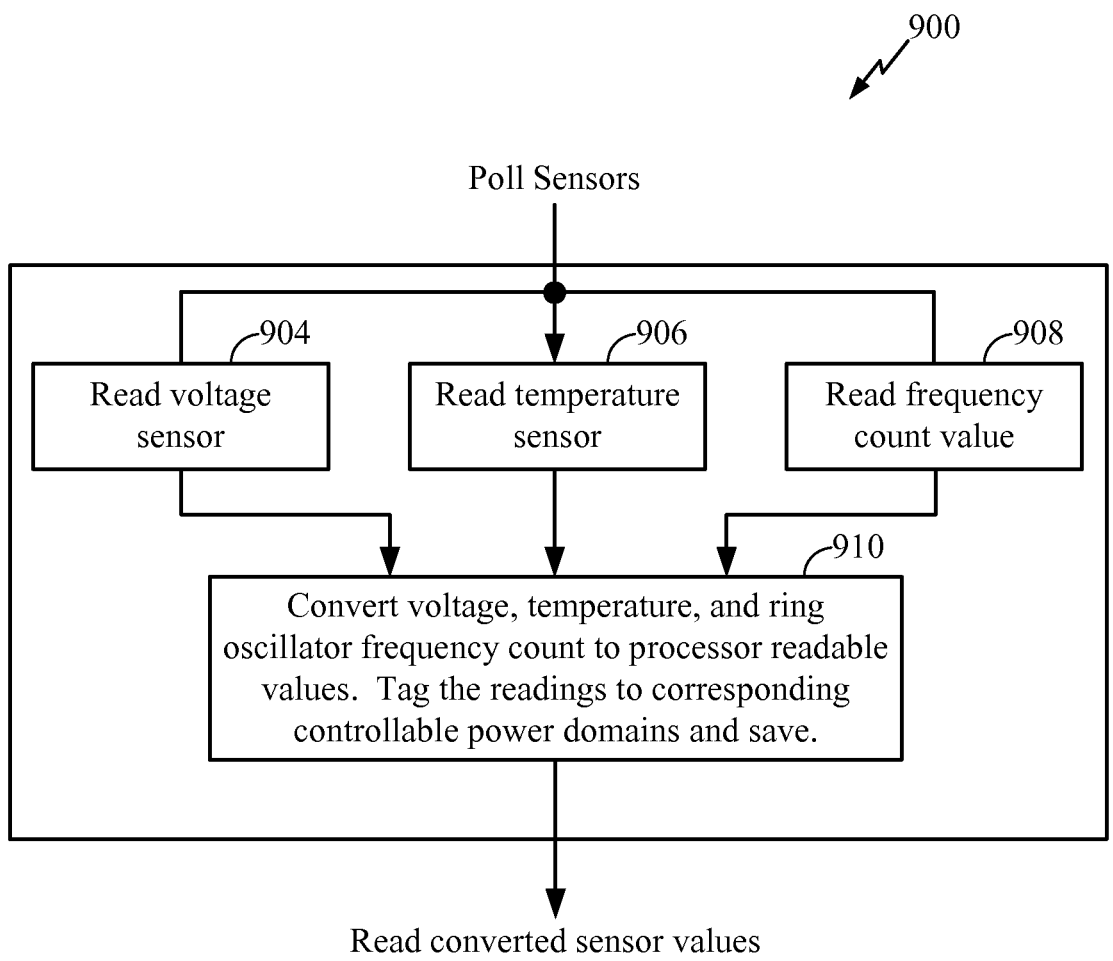
FIG. 9 is a flowchart for an exemplary sensor polling process for determining a static leakage current and dynamic power from various sensor outputs.

FIG. 9 is a flowchart for an exemplary sensor polling process 900 to determine a static leakage current and dynamic power from various sensor outputs. The process 900 may be embodied in a software procedure or procedures operating within the framework of the multi-processor OS. A system process enables block 504 to poll the sensors. At block 904, a voltage sensor, such as voltage sensor 474 of FIG. 4C, is read. At block 906, a temperature sensor, such as temperature sensor 476 of FIG. 4C, is read. At block 908, a frequency count value is read from a frequency counter, such as frequency counter 436 of FIG. 4B. At block 910, the sensor values that are read are converted to processor readable values, such as digital values representative of the sensed conditions. The readings are tagged to the corresponding controllable power domain and saved. Block 910 may individually select, either under hardware or software control, a sensor to be read, converted, and tagged.

Leakage current may stem from a variety of factors, such as drain to source leakage current and gate leakage current, for example. The dominant form of leakage current generally varies according to the process technology used. One of the largest sources of leakage current in traditional processes has been the drain to source leakage current. As described in "Reverse-Body Bias and Supply Collapse for Low Effective Standby Power" by L. T. Clark, M. Morrow, and W. Brown in IEEE Transactions on Very Large Scale Integration (VLSI) Systems, Vol. 12, No. 9, September 2004 which is incorporated herein by reference, the drain to source leakage current ($I_{off}$) may be approximately calculated utilizing equation 2:

$$I_{off} = e^{\left(\frac{-V_t}{S/\ln 10}\right)} \quad (2)$$

where $V_t$ is the threshold voltage, S is the subthreshold voltage swing determined from equation 3:

$$S = \frac{kT}{q}\ln(10)\left\{1 + \frac{C_D}{C_{OX}}\right\} \quad (3)$$

where k is the Boltzmann constant, T is an operating temperature in Kelvin, q is the elementary charge, $C_D$ is the depletion layer capacitance, and $C_{OX}$ is the gate oxide capacitance making the leakage current $I_{off}$ dependent upon the temperature and the process used in manufacturing the controllable power domain being evaluated. Based on a particular temperature sensor reading, such as provided at block 504 in FIG. 9 and utilizing equations 2 and 3, leakage current information may be estimated. Leakage current may also be based on previous calibrations, as described with regard to the calibration process 500 of FIG. 5 where a frequency count value, as provided at block 908 in FIG. 9, may be calibrated for leakage current measurements. In addition, the voltage readings provided by block 904 of FIG. 9, may also be used in determining leakage current information and in determining or verifying dynamic power utilization.

The various illustrative logical blocks, modules, circuits, elements, and the components described in connection with the embodiments disclosed herein may be implemented or performed with a general purpose processor, a digital signal processor (DSP), an application specific integrated circuit (ASIC), a field programmable gate array (FPGA) or other programmable logic components, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer readable storage medium known in the art. A computer readable storage medium may be coupled to the processor such that the processor can read information from, and write information to, the computer readable storage medium. In the alternative, the computer readable storage medium may be integral to the processor.

While the invention is disclosed in the context of illustrative embodiments for adaptive thread scheduling on a plurality of cores, it will be recognized that a wide variety of implementations may be employed by persons of ordinary skill in the art consistent with the above discussion and the claims which follow below.

What is claimed is:

1. A method for adaptive thread scheduling on a plurality of cores for reducing system energy usage, wherein each core has one or more leakage current sensors, the method comprising:

calibrating each of the leakage current sensors utilized to provide a leakage current information associated with each of the plurality of cores based on a comparison of leakage current sensor readings to expected leakage current sensor values at a specific temperature, wherein the specific temperature is based on reading multiple temperature sensors with the frequencies of operation of each of the cores set to zero hertz and finding an average temperature among the multiple temperature readings that are within a specified tolerance;

receiving the leakage current information for each of the plurality of cores;

determining leakage power for each of the plurality of cores based in part on the leakage current information;

determining a frequency requirement associated with a thread that is to be allocated to any one of the plurality of cores;

determining dynamic power for each of the plurality of cores based on a current operating temperature of each core and the frequency requirement associated with the thread;

determining a core power of each of the plurality of cores as a sum of the leakage power and the dynamic power; and scheduling the thread on one of the plurality of cores with a lowest core power.

2. The method of claim 1 further comprising:
reading a plurality of direct leakage current sensors in the plurality of cores to determine the leakage current information associated with the plurality of cores.

3. The method of claim 1 further comprising:
reading a plurality of temperature sensors to determine operating temperatures associated with corresponding cores and, based upon the operating temperatures and predetermined process constants associated with the cores, calculating the leakage current information associated with the plurality of cores.

4. The method of claim 3 wherein the leakage current information is calculated according to $I_{off} = e^{\{-V_t/(S/\ln 10)\}}$ where $I_{off}$ is the leakage current information, $V_t$ is the threshold voltage, S is the subthreshold voltage swing according to $S = kT/q \star \ln(10)\{1+C_D/C_{OX}\}$ where k is the Boltzmann constant, T is the operating temperature in Kelvin, q is the elementary charge, $C_D$ is the depletion layer capacitance, and $C_{OX}$ is the gate oxide capacitance and $V_t$, k, q, $C_D$, and $C_{OX}$ are the predetermined process constants.

5. The method of claim 1 further comprising:
reading a plurality of frequency sensors in the plurality of cores, wherein at least one of the frequency sensors is a ring oscillator constructed with transistors utilized in an associated core, wherein a frequency of operation of the ring oscillator is measured and read to determine the leakage current information for the associated core.

6. The method of claim 1 wherein scheduling a thread on one of the plurality of cores comprises:
   determining at least one crossover frequency associated with the plurality of cores; and
   scheduling the thread on one of the plurality of cores having a lower leakage power and a higher efficiency at a lower assigned frequency than the other cores of the plurality of cores.

7. The method of claim 1 wherein scheduling a thread on one of the plurality of cores comprises:
   calculating dynamic power for the plurality of cores at an assigned frequency and voltage for the thread to be allocated;
   calculating a core power for the plurality of cores as a sum of the respective dynamic power and leakage power; and
   assigning the thread to the core with the lowest core power.

8. The method of claim 1 further comprising:
   determining a sensor reading for a core does not meet an expected sensor value for present application but does meet an expected sensor value for another application; and
   binning the core for use in the other application.

9. An apparatus comprising:
   a multiprocessor comprising a plurality of cores;
   one or more leakage current sensors associated with each of the plurality of cores for providing leakage current information associated with each of the plurality of cores, wherein each of the leakage current sensors is calibrated based on a comparison of leakage current sensor readings to expected leakage current sensor values at a specific environment temperature, wherein the specific environment temperature is based on reading multiple temperature sensors, with frequencies of operation of the cores set to zero hertz, to find an average temperature among the multiple temperature readings that are within a specified tolerance;
   logic configured to receive the leakage current information for each of the plurality of cores;
   logic configured to determine leakage power for each of the plurality of cores based in part on the leakage current information;
   logic configured to determine a frequency requirement associated with a thread that is to be allocated to any one of the plurality of cores;
   logic configured to determine dynamic power for each of the plurality of cores based on a current operating temperature of each core and the frequency requirement associated with the thread;
   logic configured to determine a core power of each of the plurality of cores as a sum of the leakage power and the dynamic power; and
   logic configured to schedule the thread on one of the plurality of cores with a lowest core power.

10. The apparatus of claim 9, wherein the plurality of sensors includes at least one sensor that provides a direct reading of leakage current to provide the leakage current information.

11. The apparatus of claim 9 wherein the plurality of sensors includes at least one sensor that is a ring oscillator constructed with transistors utilized in an associated core, wherein a frequency of operation of the ring oscillator is measured and read to determine the leakage current information for the associated core.

12. A non-transitory computer readable storage medium whose contents, when executed, cause an asymmetric multiprocessor having a plurality of processor cores configured for adaptive thread scheduling for reducing system energy usage, wherein each core has one or more leakage current sensors, to:
   calibrate each of the leakage current sensors utilized to provide a leakage current information associated with each of the plurality of cores based on a comparison of leakage current sensor readings to expected leakage current sensor values at a specific temperature, wherein the specific temperature is based on reading multiple temperature sensors with the frequencies of operation of each of the cores set to zero hertz and finding an average temperature among the multiple temperature readings that are within a specified tolerance;
   receive the leakage current information for each of the plurality of cores;
   determine leakage power for each of the plurality of cores based in part on the leakage current information;
   determine a frequency requirement associated with a thread that is to be allocated to any one of the plurality of cores;
   determine dynamic power for each of the plurality of cores based on a current operating temperature of each core and the frequency requirement associated with the thread;
   determine a core power of each of the plurality of cores as a sum of the leakage power and the dynamic power; and
   schedule the thread on one of the plurality of cores with a lowest core power.

13. The non-transitory computer readable storage medium of claim 12, whose contents, when executed, further cause the asymmetric multiprocessor to:
   read a plurality of direct leakage current sensors in the plurality of cores to determine the leakage current information associated with the plurality of cores.

14. The non-transitory computer readable storage medium of claim 12, whose contents, when executed, further cause the asymmetric multiprocessor to:
   read a plurality of temperature sensors to determine operating temperatures associated with corresponding cores and, based upon the operating temperatures and predetermined process constants associated with the cores, calculate the leakage current information associated with the plurality of cores.

15. The non-transitory computer readable storage medium of claim 12, whose contents, when executed, further cause the asymmetric multiprocessor to:
   read a plurality of frequency sensors in the plurality of cores, wherein at least one of the frequency sensors is a ring oscillator constructed with transistors utilized in an associated core, wherein a frequency of operation of the ring oscillator is measured and read to determine the leakage current information for the associated core.

16. The non-transitory computer readable storage medium of claim 12 wherein, to schedule a thread on one of the plurality of cores, the non-transitory computer readable storage medium further causes the asymmetric multiprocessor to:
   calculate dynamic power for the plurality of cores at an assigned frequency and voltage for the thread to be allocated;
   determine a core power for each of the plurality of cores as a sum of the dynamic power and the leakage power; and
   assign the thread to the core with the lowest core power.

* * * * *